(12) United States Patent
Kidera (10) Patent No.: US 7,518,607 B2
(45) Date of Patent: Apr. 14, 2009

(54) HIDDEN-LINE REMOVAL METHOD

(75) Inventor: Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 10/967,640

(22) Filed: Oct. 19, 2004

(65) Prior Publication Data

US 2005/0219243 A1 Oct. 6, 2005

(30) Foreign Application Priority Data

Apr. 5, 2004 (JP) ............................. 2004-110994

(51) Int. Cl.
*G06F 17/00* (2006.01)
*G06T 1/00* (2006.01)
*G06T 15/00* (2006.01)
*G06T 15/40* (2006.01)

(52) U.S. Cl. .................. 345/421; 345/418; 345/419; 345/422

(58) Field of Classification Search ................. 345/421, 345/502

See application file for complete search history.

(56) References Cited

U.S. PATENT DOCUMENTS

| | | | | |
|---|---|---|---|---|
| 3,602,702 A * | 8/1971 | Warnock | .................... | 345/421 |
| 3,889,107 A * | 6/1975 | Sutherland | ................... | 345/623 |
| 4,694,404 A * | 9/1987 | Meagher | .................... | 345/421 |
| 5,086,496 A * | 2/1992 | Mulmuley | ................... | 345/421 |
| 5,537,520 A | 7/1996 | Doi et al. | | |
| 5,579,455 A * | 11/1996 | Greene et al. | ................ | 345/422 |
| 5,729,672 A * | 3/1998 | Ashton | .................... | 345/589 |
| 5,977,980 A * | 11/1999 | Aleksicy | .................... | 345/422 |
| 6,456,283 B1 | 9/2002 | Ishida | | |
| 6,525,726 B1 * | 2/2003 | Xie et al. | .................... | 345/421 |
| 6,999,091 B2 * | 2/2006 | Saxena et al. | ............... | 345/566 |
| 7,218,321 B2 * | 5/2007 | Kidera | ........................ | 345/421 |
| 2003/0103048 A1 * | 6/2003 | Kindratenko et al. | ....... | 345/421 |
| 2003/0122820 A1 * | 7/2003 | Doyle | ......................... | 345/421 |
| 2003/0122837 A1 * | 7/2003 | Saxena et al. | ............... | 345/566 |
| 2003/0227455 A1 * | 12/2003 | Lake et al. | .................. | 345/421 |
| 2004/0179019 A1 * | 9/2004 | Sabella et al. | ............... | 345/537 |
| 2004/0189634 A1 * | 9/2004 | Kidera | ........................ | 345/421 |

(Continued)

FOREIGN PATENT DOCUMENTS

JP 7-92838 10/1995

(Continued)

OTHER PUBLICATIONS

Reference AG (Japanese Patent No. 9-179999) corresponds to the U.S. issued Patent No. 6,456,283.

(Continued)

*Primary Examiner*—Ulka Chauhan
*Assistant Examiner*—Crystal Murdoch
(74) *Attorney, Agent, or Firm*—Staas & Halsey LLP (57) ABSTRACT

A hidden-line removal method is provided which is executed in an image processing apparatus. The method includes the steps of extracting portions of the polygons contained in each of the divided areas on a two-dimensional plane using the projected three-dimensional model and calculating memory consumption for each of the areas using the extracted polygons. The method includes the steps of determining the optimized division style based on the calculated memory consumption and executing the hidden-line removal based on the optimized division style.

15 Claims, 7 Drawing Sheets

U.S. PATENT DOCUMENTS

| | | | |
|---|---|---|---|
| 2005/0017971 A1* | 1/2005 | Ard | 345/423 |
| 2005/0017986 A1* | 1/2005 | Anwar et al. | 345/629 |
| 2005/0052455 A1* | 3/2005 | Long et al. | 345/422 |
| 2006/0192779 A1* | 8/2006 | Kidera | 345/421 |

FOREIGN PATENT DOCUMENTS

| | | |
|---|---|---|
| JP | 9-179999 | 7/1997 |
| JP | 10-134204 | 5/1998 |

OTHER PUBLICATIONS

Reference AH (Japanese Patent No. 7-92838) corresponds to the U.S. issued Patent No. 5,537,520.

Reference AI (Japanese Patent No. 10-134204) includes the English Translation of the Claims 1-9.

* cited by examiner

| PROCESSING SPEED | 200MB (AVAILABLE CAPACITY) | 81 |
| --- | --- | --- |
| MEMORY CONSUMPTION | 150MB | 82 |
| MODE | (MEMORY CONSUMPTION, MIDDLE OR PROCESSING SPEED) | 83 |

HIDDEN-LINE REMOVAL METHOD

BACKGROUND OF THE INVENTION

1. Field of the Invention

The present invention relates generally to so-called "hidden-line removal" for erasing hidden lines when a three-dimensional model including a plurality of polygons is projected onto a two-dimensional plane, and more particularly to a hidden-line removal method in which processes are executed with memory consumption optimized.

2. Description of the Related Art

When a three-dimensional shape created by computer graphics is printed on a paper sheet or displayed on a display, an image is produced by extracting the ridge lines and outlines and projecting them onto a two-dimensional plane. In this case, when the three-dimensional shape is looked at from a viewpoint, so-called "hidden-line removal" and "hidden-face removal" are executed, in which ridge lines and outlines that can not be looked at actually due to the figures obscuring them are erased or those lines are represented by dotted lines.

As hidden-line (face) removal, when the three-dimensional shape is constituted as an aggregate of polygons, Z-sort method in which the depth value (Z value) is calculated for each polygon and an image is drawn sorting the polygons in the order of their Z values, and Z-buffer method in which a figure having a smaller Z value (the closest figure) is drawn into a frame buffer for each pixel, are known. In addition, methods that have been proposed include a method in which production of an image for which hidden faces have been removed is arranged to be executed at a high speed by dividing the screen into rectangular blocks and repeating production of a block image for which hidden faces have been removed (see Japanese Patent Application Laid-Open Publication No. 1997-179999), a method in which a high accuracy drawing process is realized by dividing the shape into a plurality of blocks according to their Z values and executing sorting of the blocks as well as executing sorting within each block (see Japanese Patent Application Laid-Open Publication No. 1998-134204), a method in which determination of the order of the depth and hidden-face removal are executed at a high-speed by dividing the spatial area into rectangular parallelepipeds, dividing further each rectangular parallelepiped into tetrahedrons and obtaining equivalent function value curved surface using approximation (Japanese Patent Application Laid-Open Publication No. 1995-92838) and a method in which data are processed at a high accuracy by solving mathematically the decision of crossing of ridge lines and outlines over polygons.

SUMMARY OF THE INVENTION

However, in the conventional methods described above, a memory consumption is determined fixedly according to the method employed as hidden-line removal. Therefore, when the process is executed by an old-model notebook-type personal computer in which the capacity of the memory mounted in the computer that executes hidden-line removal is small, or when the memory capacity available for hidden-line removal is not sufficient as a result of using the memory mounted in the computer, for other processes, a swap often occurs. "swap" means that the contents of the memory is temporarily saved in a swap file on a hard disk and is written as necessary back in the memory. Generally, compared to the access speed to a memory, the access speed to a hard disk is lower. Therefore, there is a problem that the processing speed of the computer is lowered when a swap occurs.

Furthermore, the memory consumption necessary for hidden-line removal can not be changed in response to current state of using memory and the memory capacity mounted. Therefore, for example, when hidden-line removal is executed in a way like a batch process using a multi-task OS (Operating System), in the case where there is no room in the current state of using memory or where an apparatus having a memory with small capacity is used, the memory consumption for hidden-line removal is suppressed in order to secure the memory capacity for executing other processes. However, in the case where there is room in the current state of using memory or some capacity is added to the memory, hidden-line removal that gives priority to the processing speed regardless of memory consumption can not be executed.

It is therefore the object of the invention to provide a hidden-line removal method that optimizes memory consumption necessary for hidden-line removal in response to a state of using memory and the memory capacity mounted, and that prevents occurrence of swap.

In order to achieve the above object, according to a first aspect of the present invention there is provided a hidden-line removal method executed in an image processing apparatus, in which projection of lines obscured by polygons included in a three-dimensional model is avoided when projecting the three-dimensional model onto a two-dimensional plane. The image processing apparatus has a memory for storing data relating to the hidden-line removal and data relating to processes other than the hidden-line removal. And an upper limit value of capacity of the memory used for the hidden-line removal is set in advance. The method includes the steps of, when the two-dimensional plane is divided into a plurality of areas, extracting portions of the polygons contained in each of the areas using the projected three-dimensional model, and calculating memory consumption for each of the areas based on the extracted polygons. The method further includes the steps of, when the maximum of the calculated memory consumption for each of the areas is equal to or larger than the upper limit value, sub dividing the two-dimensional plane to extract the polygons using the projected three-dimensional model contained in the subdivided areas and repeating the calculation of memory consumption based on the extracted polygons, and when the maximum of the calculated memory consumption for each of the areas is smaller than the upper limit value, executing hidden-line removal for the extracted polygons in each of the areas and, after generating hidden-line removal data for each of the areas, integrating the hidden-line removal data for the plurality of areas.

The upper limit value is preferably set based on an available capacity of the memory before the extraction of the polygons. Priority relating to memory consumption and to processing time may further be set in advance, such that when the priority of processing time is higher than the priority of memory consumption, the upper limit value may be set based on an available capacity of the memory before the extraction of the polygons, and that when the priority of processing time is lower than the priority of memory consumption, the upper limit value may be set at a value of a capacity smaller than the available capacity of the memory before the extraction of the polygons.

In order to achieve the above object, according to a second aspect of the present invention there is provided a storage medium in which a program executed in an image processing apparatus is stored to execute hidden-line removal in which projection of lines obscured by the polygons included in a three-dimensional model is avoided when projecting the three-dimensional model onto a two-dimensional plane. The image processing apparatus has a memory for storing data relating to the hidden-line removal and data relating to processes other than the hidden-line removal, and an upper limit value of capacity of the memory used for the hidden-line removal is set in advance. The program causes the image processing apparatus to execute the steps of when the two-dimensional plane is divided into a plurality of areas, extracting portions of the polygons contained in each of the areas using the projected three-dimensional model, and calculating memory consumption for each of the areas based on the extracted polygons. The program further causes the image processing apparatus to execute the steps of, when the maximum of the calculated memory consumption for each of the areas is equal to or larger than the upper limit value, subdividing the two-dimensional plane to extract the polygons using the projected three-dimensional model contained in the subdivided areas and repeating the calculation of memory consumption based on the extracted polygons, and when the maximum of the calculated memory consumption for each of the areas is smaller than the upper limit value, executing hidden-line removal for the extracted polygons in each of the areas and, after generating hidden-line removal data for each of the areas, and integrating the hidden-line removal data for the plurality of areas.

In order to attain the above object, according to a third aspect of the present invention there is provided an image processing apparatus for executing hidden-line removal in which projection of lines obscured by the polygons included in a three-dimensional model is avoided when projecting the three-dimensional model onto a two-dimensional plane. The image processing apparatus has a memory which stores data accompanying image processing, and is set an upper limit value of the capacity usable for the hidden-line removal therein. The image processing apparatus further includes a dividing style determining unit which, when the two-dimensional plane is divided into a plurality of areas, extracts portions of the polygons contained in each of the areas using the projected three-dimensional model, calculats memory consumption for each of the areas based on the extracted polygons, subdivides the two-dimensional plane to extract the polygons using the projected three-dimensional model contained in the subdivided areas until the maximum of the calculated memory consumption for each of the areas becomes smaller than the upper limit value, repeats the calculation of memory consumption based on the extracted polygons, and determines the dividing style of the two-dimensional plane. The image processing apparatus also includes a hidden-line removal unit which, executes hidden-line removal on the extracted polygons in each of the areas after division depending on the dividing style determined by the dividing style determining unit and creates hidden-line removal data for each of the areas, and a integrating unit which integrates the hidden-line removal data for the plurality of areas.

According to the invention, it is possible to realize a hidden-line removal method that optimizes the amount of the memory capacity consumption necessary for hidden-line removal in response to the use state of the memory and the memory capacity mounted, and that prevents occurrence of swap.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

An embodiment of the invention will now be described with reference to the drawings. However, the technical scope of the invention is not limited to the following embodiment and encompasses the inventions according to the claims and their equivalents.

Figure 1A:
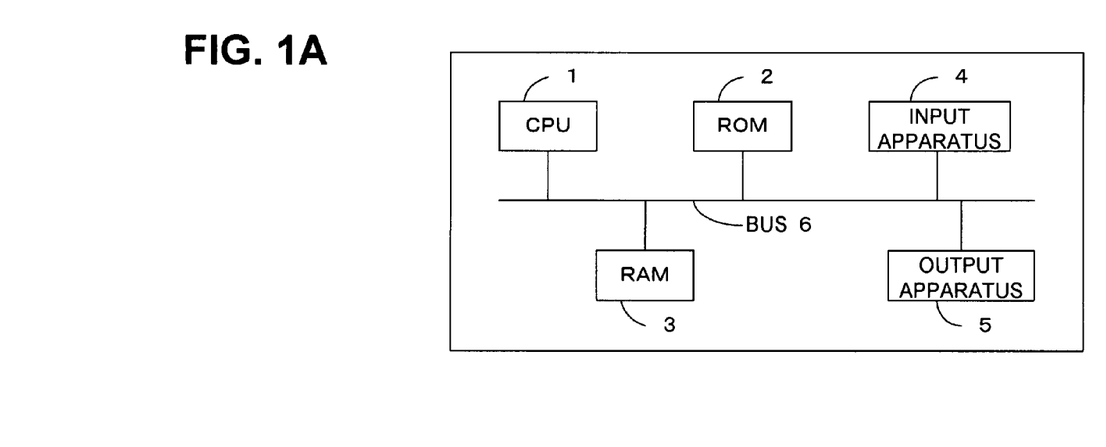
FIG. 1A shows a block diagram of an exemplary composition of an image processing apparatus according to an embodiment of the invention.
Figure 1B:
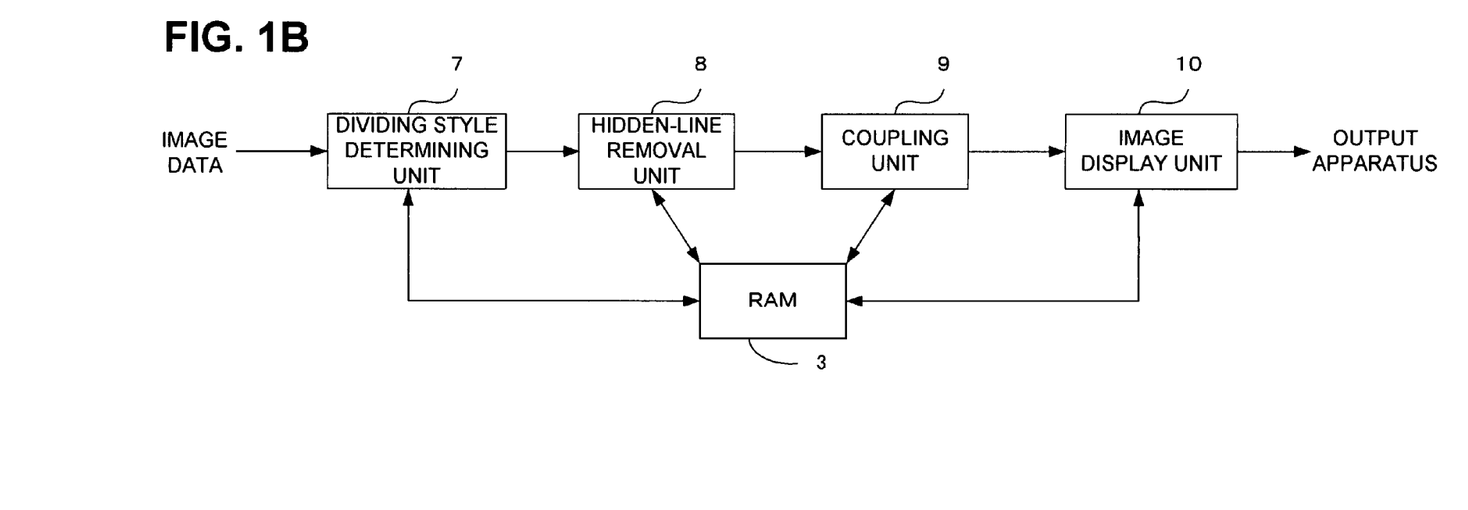
FIG. 1B shows a functional block diagram of the image processing apparatus according to the embodiment of the invention.

FIG. 1A shows a block diagram of an exemplary composition, and FIG. 1B shows a functional block diagram, of an image processing apparatus that executes a hidden-line removal method of the embodiment by the conversion of three-dimensional image data into two-dimensional data. In FIG. 1A, a program that controls the method of the invention is stored in an ROM 2. A CPU 1 reads and executes this program. Intermediate data generated in the course of the image processing are stored in an RAM 3.

An input apparatus 4 is a keyboard and is used by an operator for inputting settings necessary for the hidden-line removal. An output apparatus 5 is a CRT (Cathode Ray Tube) monitor or a printer. Various messages accompanying the three-dimensional image before the conversion, the two-dimensional image after the conversion and the hidden-line removal are displayed or printed by them, and an interface screen for making settings necessary for the hidden-line removal is provided by them.

In FIG. 1B, when the three-dimensional data are provided to a dividing style determining unit 7, the two dimensional plane onto which the three-dimensional image data is projected is divided into partial areas based on an upper limit value preset and stored in, for example, the RAM 3. The dividing style determining unit 7 divides the two-dimensional plane until memory consumption of each partial area necessary for hidden-line removal, becomes smaller than the upper limit value, and provides the final dividing style to a hidden-line removal unit 8. The hidden-line removal unit 8 extracts lines from polygons contained in each partial area based on the inputted dividing style, executes hidden-line removal to each partial area and outputs the result to a integrating unit 9 as hidden-line removal data. The integrating unit 9 integrates the hidden-line removal data created for each partial area and writes them into a frame buffer secured in, for example, the RAM 3. An image display unit 10 reads repeatedly the data written in the frame buffer, converts them into a video signal etc. and outputs it to the CRT (Cathode Ray Tube) monitor or the printer, being an output apparatus.

Figure 2:
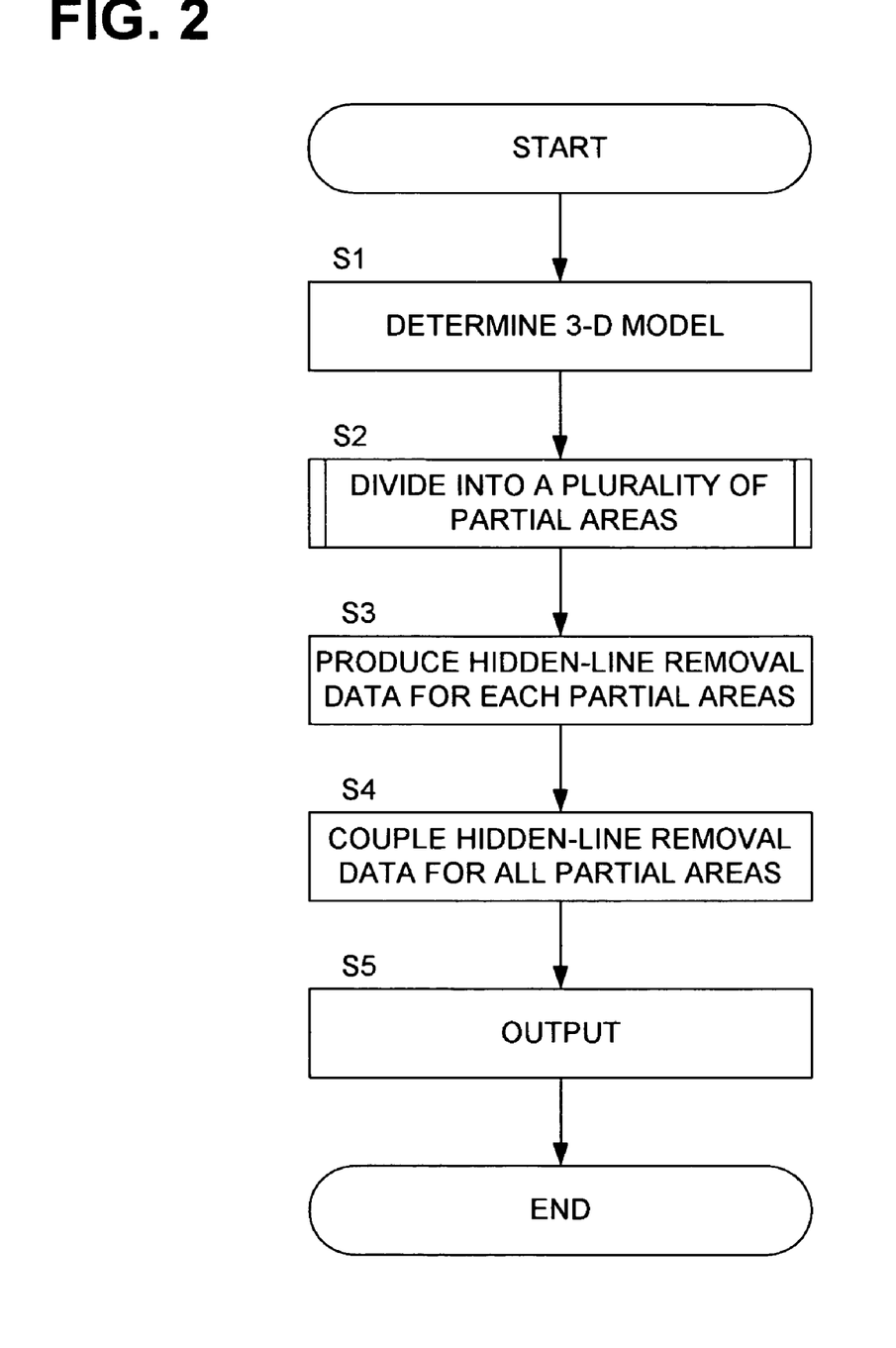
FIG. 2 is a flowchart showing the process steps of a hidden-line removal method.

FIG. 2 is a flowchart showing the process steps of a common hidden-line removal method. First, a three-dimensional model (three-dimensional image data) to be the target to execute the hidden-line removal to is determined (S1). The three-dimensional model is provided to the dividing style determining unit 7 and, at this time, the direction of the line of sight and the area to be outputted are also determined.

Next, the dividing style determining unit 7 divides the two-dimensional plane onto which the three-dimensional model is projected into a plurality of partial areas (S2). Step S2 is a characteristic process in the hidden-line removal method of the embodiment and will be described in detail referring to FIG. 3.

When the dividing style determining unit 7 has determined the final dividing style in Step S2, hidden-line removal is executed in each of the divided partial areas and hidden-line removal data are produced (S3). The hidden-line removal data refers to the three-dimensional image data projected onto the two-dimensional plane after hidden-line removal has been executed to each of the partial areas. In Step S2, polygons necessary for hidden-line removal are stored for each of the partial areas and the hidden-line removal unit 8 extracts borderlines belonging to the same partial area from each of the polygon. That is, the hidden-line removal unit 8 extracts, for a borderline whose end points are completely contained in a partial area, each entire borderline and, for a borderline which extends out of a partial area, only each portion contained in a partial area.

Then, the hidden-line removal unit 8 executes hidden-line removal for the borderlines obtained in each partial area. Therefore, a process is executed in which the lines which are not visible from the direction of the line of sight due to other polygons obscuring them are erased or are changed into dotted lines. As the hidden-line removal method executed to each partial area in Step S3, various hidden-line removal methods can be employed. However, different from the conventional methods, in the method of the invention, no swaps occur when executing the removal to each partial area because the method includes the dividing step of S2. When the hidden-line removal in a partial area to be processed has been completed, the stored polygons are deleted.

When production of hidden-line removal data in all the partial areas has been completed, the integrating unit 9 integrates the hidden-line removal data for all the partial areas (S4). Then, the integrated hidden-line removal is stored in, for example, a frame buffer provided to the RAM 3 and displayed on a display apparatus being the output apparatus 5 by the image display unit 10 (S5) The frame buffer may be provided separately from the RAM 3. The output apparatus 5 may be a printer.

Figure 3:
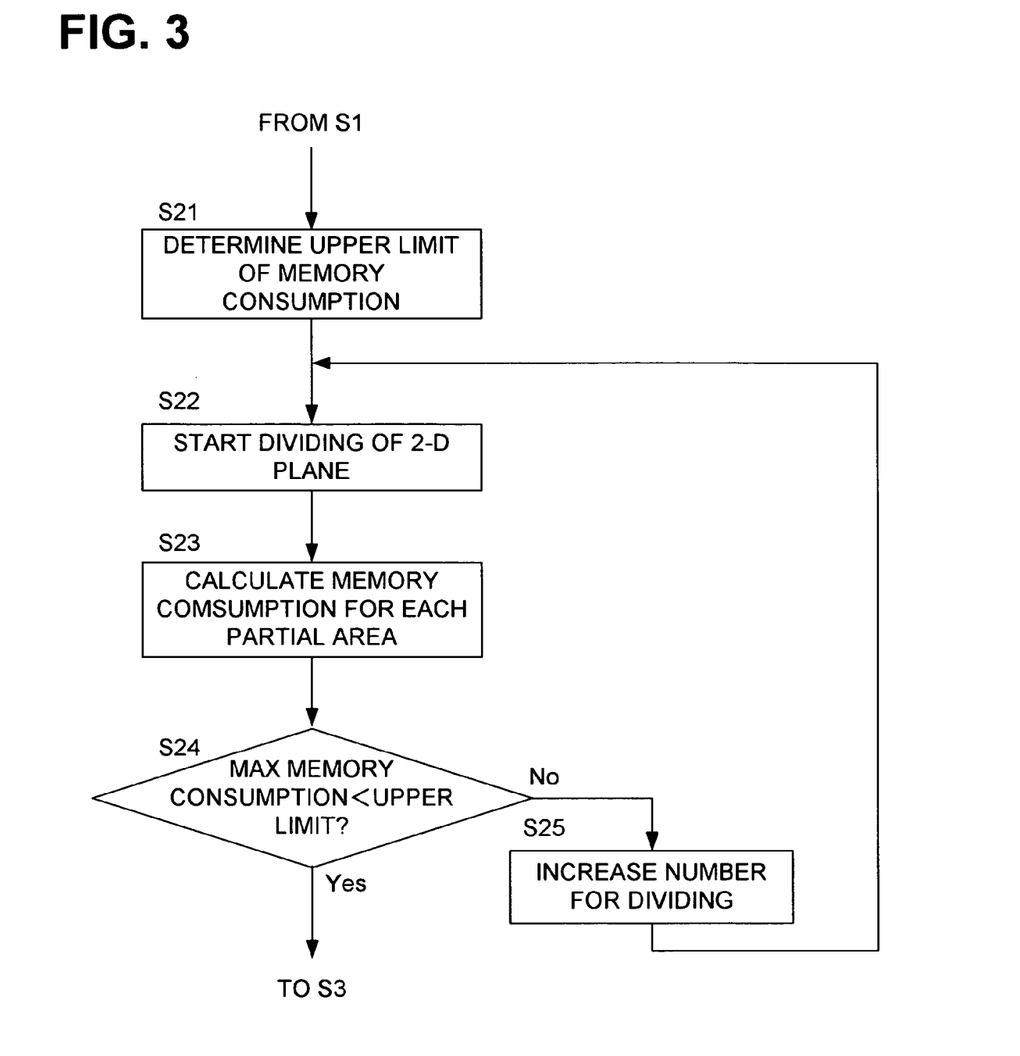
FIG. 3 is a flowchart illustrating in detail Step S2 shown in FIG. 2.

FIG. 3 is a flowchart for illustrating the Step S2 in detail shown in FIG. 2. First, an upper limit value of memory consumption that can be used for the hidden-line removal is determined (S21). The upper limit value is determined, for example, based on the capacity in the unused area (available capacity) in the RAM3 when Step S2 is started. The available capacity of the memory can be automatically obtained by having the image processing apparatus issue the system command. Various types of this obtaining method exist depending on the OS (Operating System) of the image processing apparatus. The available capacity of the memory is small when the RAM 3 is occupied by other processes executed by the image processing apparatus, and is large when other few processes are being executed. Therefore, the upper limit value is changed in response to the status of use of the RAM 3 in the image processing apparatus.

Furthermore, because the available capacity of the memory does not exceed the total capacity of the RAM 3 mounted on the image processing apparatus, the memory consumption for the hidden-line removal can be prevented from exceeding the mounted memory capacity. As described above, the image processing apparatus sets the obtained available capacity of the memory as the upper limit value and stores it in the RAM 3. In addition, in the case where there is a consideration that it is expected that other processes are slowed because the memory capacity necessary for those processes is short when all the available capacity of the memory is assigned to the hidden-line removal, it is possible to control such that 80% of the available capacity of the memory is determined as the upper limit value.

Next, the three-dimensional model within the output area determined in Step S1 is projected onto the two-dimensional plane and dividing of the two-dimensional plane is started (S22). For example, for a polygon, even a portion of which is present in the output area and the surface of which is oriented to the side of the viewpoint, representative points such as the geometrical center are calculated and binary tree dividing is executed. To do this, area dividing should be executed in which the geometrical centers that are present as many number as the number of the polygons are divided into two.

With Step S22, the two-dimensional plane is divided into a plurality of partial areas. Next, each of the memory consumption necessary for executing the hidden-line removal to each of the partial area is calculated (S23). Memory consumption necessary for the hidden-line removal for a partial area is proportional to the number of polygons contained in the partial area. Therefore, in Step S23, the number of polygons contained in each of the partial areas is counted. Then, when the number of polygons contained in a partial area is known, it is possible to convert the number into memory consumption necessary for the hidden-line removal of the partial area.

Then, in Step S23, the maximum one among the memory consumption for the partial areas calculated in Step S23 is compared with the upper limit value determined in Step S21 (S24). In the case where at least one (1) memory consumption exceeding the upper limit value is required in the processing of the partial areas, the dividing is not sufficient because a swap is expected to occur. Then, when the maximum memory consumption obtained in Step S23 equals or exceeds the upper limit value determined in Step S21 (S24-No), the number for dividing is further increased (S25), the process returns to S22 and the binary tree dividing is continued. In this manner, until the maximum memory consumption corresponding to the partial areas after dividing becomes smaller than the upper limit value, dividing of the two-dimensional plane is repeated and, finally, memory consumption necessary for the hidden-line removal of any partial area is smaller than the upper limit value determined in Step S21.

In Step S24, when the maximum memory consumption becomes smaller than the upper limit value (S24-Yes), the any more subdividing is stopped and the process proceeds to Step S3.

By executing the process shown in FIG. 3, memory consumption is always smaller than the upper limit value. Since the upper limit value is set in advance and does not exceed the capacity of the memory mounted on the image processing apparatus, the occurrence of swaps can be prevented by the hidden-line removal. Furthermore, since available capacity of the memory is automatically set as the upper limit value, the prevention of swaps can be realized without the need for an operator to set specifically. On the other hand, the experience and the intuition of the operator can be reflected on the settings and flexible usage is also possible. In this manner, the phenomenon that the processing speed is lowered in the image processing apparatus can be avoided by the prevention of occurrence of swaps.

In order to illustrate in detail the above operation, an example will be described using the following hexahedron.

Figures 4A, 4B:
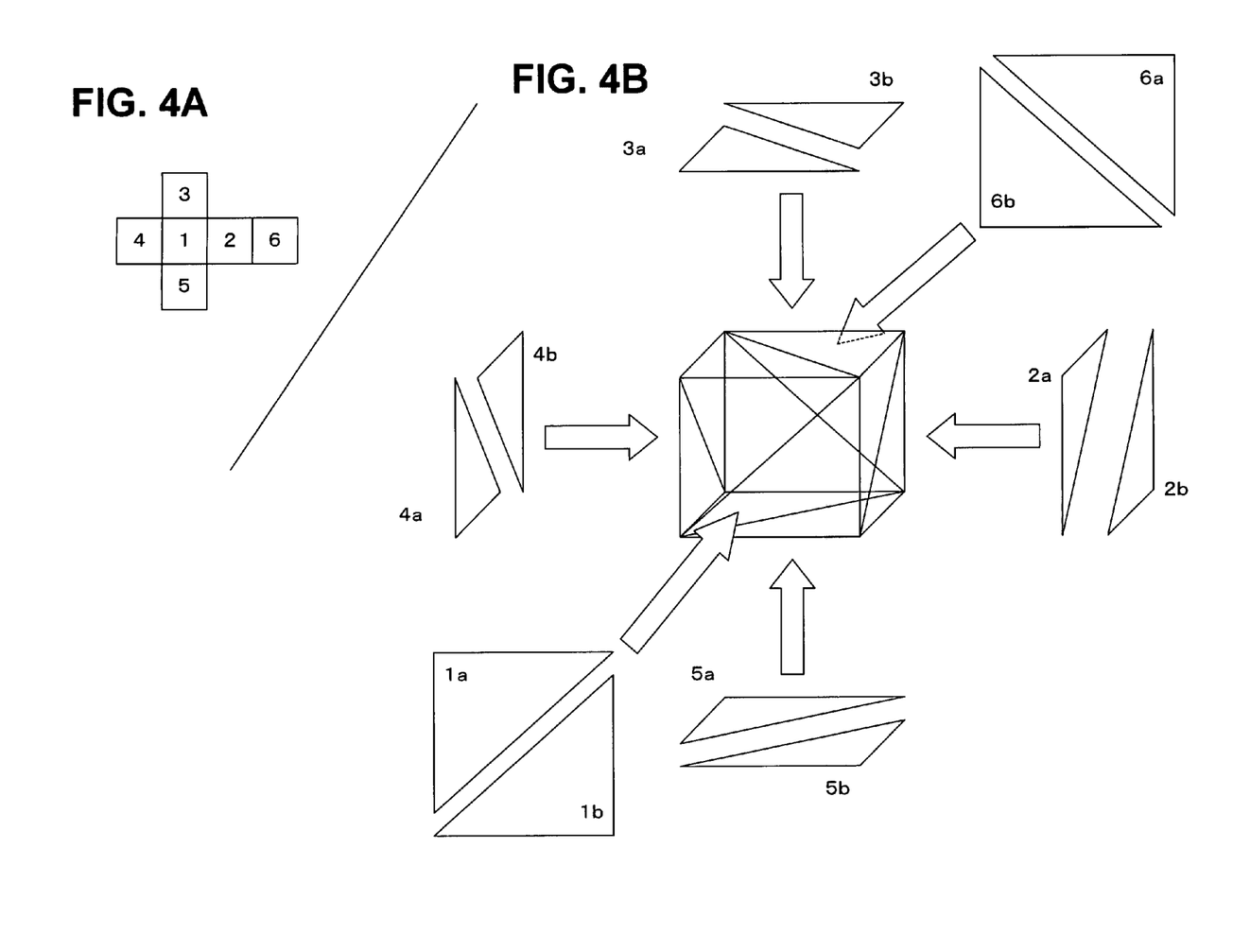
FIGS. 4A and 4B show a three-dimensional figure (regular hexahedron) used in the embodiment and the component polygons of the figure, FIG. 4A showing the development elevation of the hexahedron, and FIG. 4B showing the three-dimensional figure decomposed into polygons.

FIGS. 4A and 4B show a three-dimensional figure (regular hexahedron) used in the embodiment and the component polygons of the figure. FIG. 4A shows the development elevation of the hexahedron and a reference numeral is assigned to each face of it. Each reference numeral corresponds to a face shown in FIG. 4B and the face seen in the front in FIG. 4B is a face 1. Likewise, the upper face is a face 3; the bottom face is a face 5; the right side face is a face 2; the back face is a face 6; and the left side face is a face 4. Each face (square) of the hexahedron shown in FIG. 4B has two (2) polygons (isosceles triangle) and the face 1 has a polygon 1a and a polygon 1b. Each of the other faces also includes two (2) polygons.

Figure 5A:
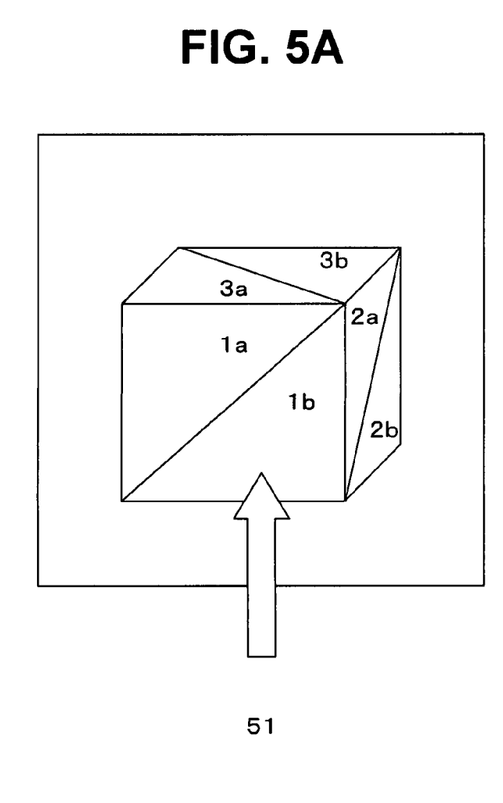
FIG. 5A shows the three-dimensional figures projected onto the two-dimensional plane.

FIG. 5A shows the three-dimensional figures projected onto the two-dimensional plane, included in the area to be outputted in the three-dimensional figures shown in FIGS. 4A and 4B. When the direction of the line of sight is the direction of the arrow 51, FIG. 5A illustrates only the polygons of which the surfaces face the viewpoint side, and six (6) polygons in total in the face 1, the face 2 and the face 3 are illustrated. This represents a state where the direction of the line of sight and the area to be outputted are determined after the three-dimensional model is set in Step S1.

Then, the upper limit value of memory consumption is determined (S2). In this embodiment, it is assumed that, as the upper limit value, memory consumption necessary for processing a partial area having the number of polygons of six is set based on the available capacity of the memory.

Figure 5B:
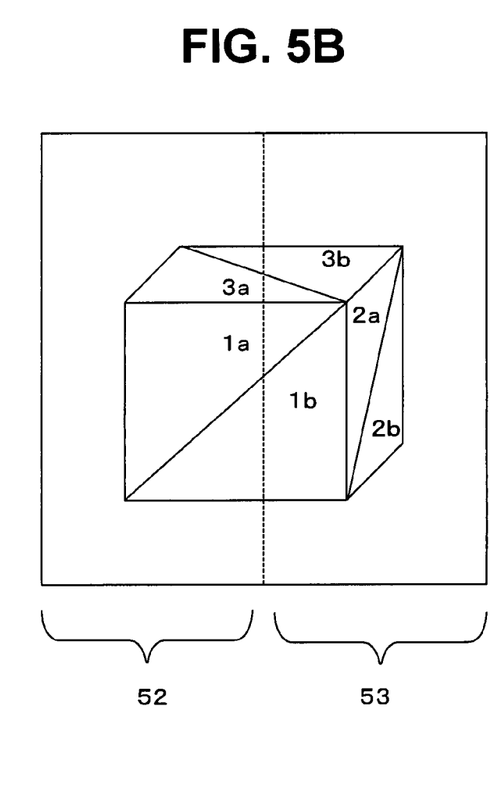
FIG. 5B shows the initial stage in which the dividing of the two-dimensional plane is started.

FIG. 5B shows the initial stage in which the dividing of the two-dimensional plane is started in Step S3. FIG. 5B is a figure produced by simply dividing FIG. 5A at the center. The dividing shown in FIG. 5B is not determined especially taking into consideration the centers of gravity of the polygons in order to simplify the description.

In Step S23 and S24 in FIG. 3, memory consumption for each partial area divided as described above is calculated and compared with the upper limit value in a manner as follows. In FIG. 5B, the polygons in a partial area 53 on the right are six (6) including a polygon 1a, a polygon 1b, a polygon 2a, a polygon 2b, a polygon 3a and a polygon 3b, taking into consideration the faces of those polygons face the viewpoint side. For a partial area 52 on the left, the polygons are four (4) including a polygon 1a, a polygon 1b, a polygon 3a and a polygon 3b. Then, the number of polygons contained in the partial area 53 on the right is larger than that of polygons contained in the partial area 52 on the left. Therefore, the maximum of the amounts of the memory capacity consumption for each partial area is the one for the partial area 53 on the right and that memory consumption is calculated as memory consumption corresponding to the number of polygons of six (6). Then, in Step S24 shown in FIG. 3, it should be determined whether or not memory consumption corresponding to the number of polygons contained in the partial area 53 exceeds the upper limit value determined in Step S21 shown in FIG. 3.

In this case, since memory consumption for the partial area 53 is equal to and not smaller than the upper limit value, the dividing is not sufficient. Then, as the result of determination that the dividing in FIG. 5B is not sufficient as the dividing (S5-No), dividing is repeated and the dividing further proceeds.

Figure 6A:
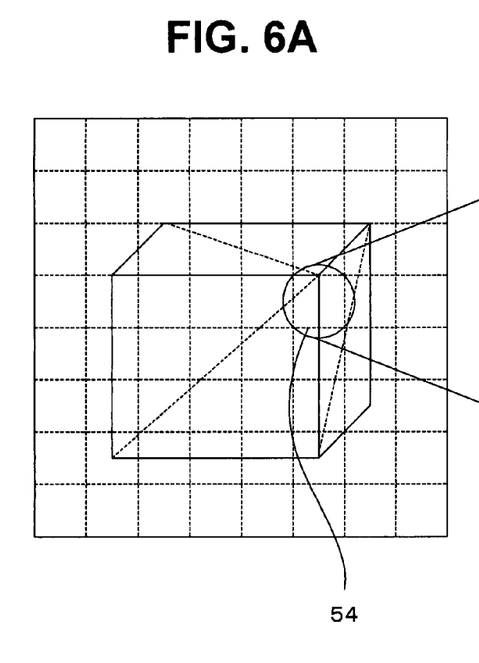
FIG. 6A shows a state where the dividing has further proceeded as the result of the determination that the dividing is not sufficient.
Figure 6B:
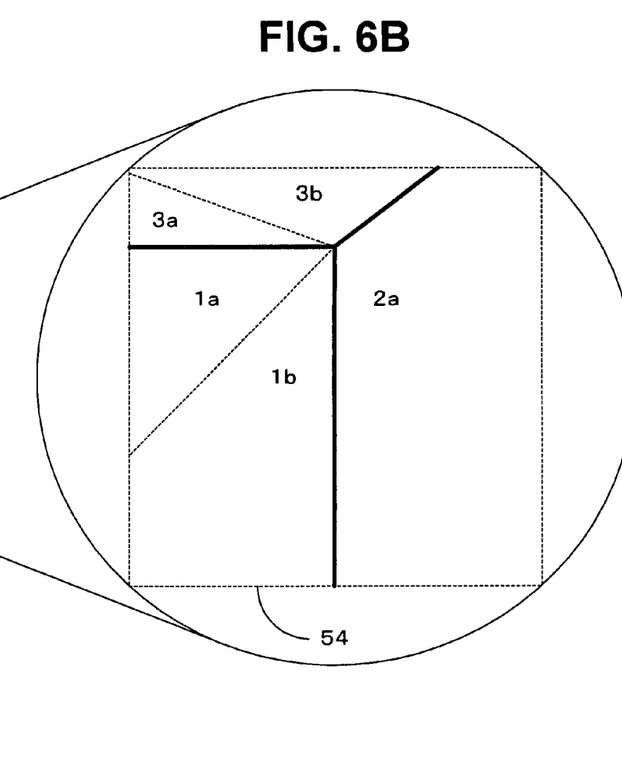
FIG. 6B is an enlarged view of the partial area contained in the circle shown in FIG. 6A.

FIG. 6A shows a state where the dividing has further proceeded as the result of the determination that the dividing is not sufficient. FIG. 6B is an enlarged view of the partial area 54 contained in the circle shown in FIG. 6A. When the division has proceeded to the extent as seen in FIG. 6A, the number of polygons contained in the partial area 54 contained in the circle shown in FIG. 6A is the maximum and the number of polygons is five (5) as shown in FIG. 6B. Therefore, subdividing is not executed any more since memory consumption corresponding to the number of polygons of five (5) is smaller than the upper limit value being set at this time (S5-Yes). Then, the style shown in FIG. 6A is determined as the final dividing style and, thereafter, hidden-line removal is executed for each of the partial areas (S8, S9 and S10).

In Step S21 shown in FIG. 3, the upper limit value is determined based on memory consumption obtained from the system command issued automatically by the image processing apparatus. However, it is possible for the operator to issue a system command manually, to know in advance the memory capacity mounted on the image processing apparatus and to input and set the upper limit value within the range of that.

Figure 7A:
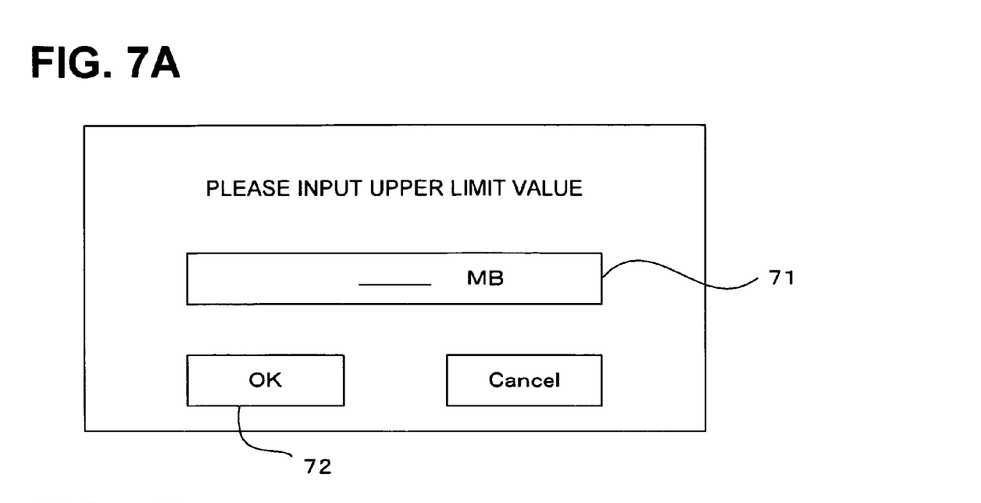
FIG. 7A shows an example of the screen displayed when an upper limit value is set and inputted by an operator.

FIG. 7A shows an example of the screen to make settings displayed at that time. When the operator inputs the values in megabytes (MB) through the input apparatus 4 into a text box 71 and clicks an OK button 72, the inputted value is set as the upper limit value. Since the operator can freely set the upper limit value through the setting screen shown in FIG. 7A, more flexible hidden-line removal for which the experience and the intuition of the operator are utilized is possible. In this case, when the screen is arranged to be able to inputted with only values smaller than the memory capacity mounted, occurrence of swaps are avoided since memory capacity exceeding the memory capacity mounted is not consumed in the divided partial areas.

Figure 7B:
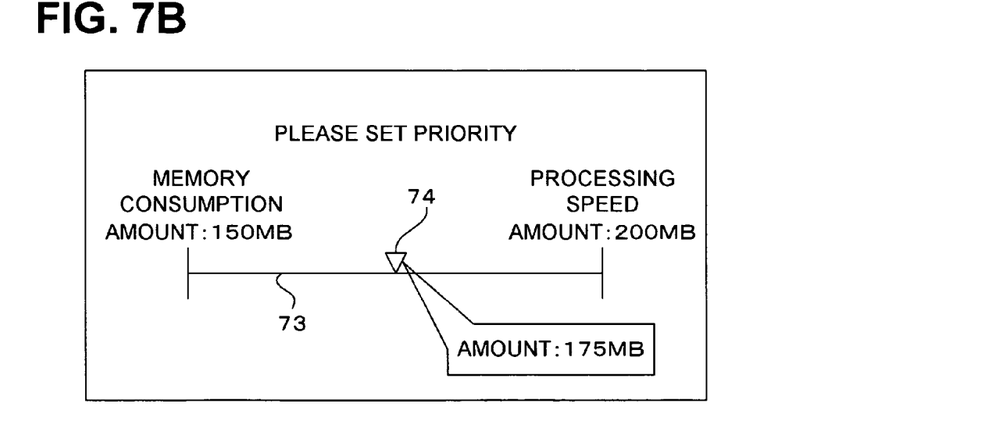
FIG. 7B shows an example of the screen to make settings displayed when priority is selected.

Furthermore, the operator may select the priority for memory consumption and the processing speed and the upper limit value may be set based on the priority. FIG. 7B shows an example of the screen to make settings displayed when selecting the priority. When the operator gives priority to memory consumption, the operator moves a pointer 74 on a slider bar 73 shown in FIG. 7B to the left through the input apparatus 4 such as a mouse and, when the operator gives priority to the processing speed, the operator moves the pointer 74 to the right.

Figure 8:
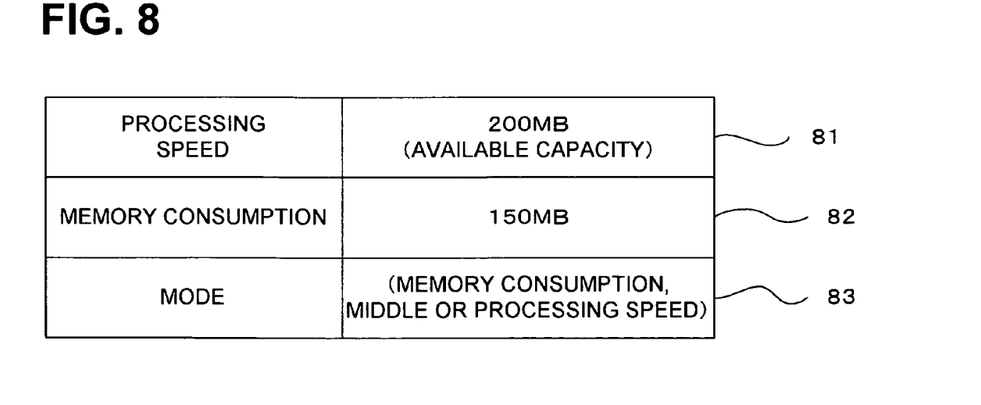
FIG. 8 shows the data structure of priority information stored in advance in the RAM.

FIG. 8 shows the data structure of priority information stored in advance in the RAM 3 before the selection when the selection of the priority is executed. In the priority information, an upper limit value 82 for the case where memory consumption is given priority and an upper limit value 81 for the case where the processing speed is given priority are stored. The upper limit value for the case where the processing speed is given priority is determined based on the available capacity of the memory before the hidden-line removal is executed. The upper limit value for the case where memory consumption is given priority is set at a value smaller than the upper limit value for the case where processing speed is given priority. Instead of this, a value inputted by the operator using a screen similar to the screen shown in FIG. 7A or a value automatically determined based on the available capacity of the memory (for example, 50% of the available capacity of the memory etc.) may be used. The priority selected by the operator is stored in a mode 83 and memory consumption, the processing speed and middle are stored depending on the case.

When the mode is middle, it indicates the case where the middle between the memory consumption edge and the processing speed edge is selected in FIG. 7B and, in this case, the upper limit value is determined based on its relative position. For example, when a point (50% point) in the middle of memory consumption edge and the processing speed edge is selected, 150+(200−150)*0.5=175 [MB] can be determined as the upper limit value. More generally, it is determined based on; the upper limit value for the case where memory consumption is given priority+(the upper value for the case where the processing speed is given priority−the upper limit value for the case where memory consumption is given priority)*the relative position (rate) of the pointer 74 on the slider bar 73.

When memory consumption is given priority, the two-dimensional plane is divided into more partial areas. On the contrary, when the processing speed is given priority, more memory capacity is secured for the hidden-line removal with the available capacity of the RAM 3 at that moment as the maximum capacity. In this manner, memory consumption used for the hidden-line removal can be flexibly varied in response to the status of use of the RAM 3 and more optimized usage of the image processing apparatus becomes possible. For example, a process is possible in which, for a time zone in which the hidden-line removal is desired to be executed with high priority, the processing speed is given priority, and for a time zone in which it can be accepted that it takes some time to execute the processing, however, memory consumption is desired to be suppressed, memory consumption is given priority. More flexible setting of the upper limit value is possible by enabling intermediate points to be selected.

Furthermore, in Step S3, it is also possible that, before starting the dividing of the two-dimensional plane, memory consumption used when no dividing is executed is calculated, i.e., all polygons contained in the two-dimensional plane are counted and memory consumption corresponding to the count is calculated, and the calculated amount is displayed on the output apparatus 5. In such a case, it is convenient for the operator because the operator can determine how many memories should be added for executing the hidden-line removal by comparing the calculated amount and the memory capacity mounted.

As described above, according to the embodiment, first, memory consumption necessary for the hidden-line removal for each partial area is smaller than the upper limit value which is set equal to or smaller than the memory capacity mounted on the image processing apparatus. Since the removal is executed after dividing the two-dimensional plane onto which the three-dimensional model is projected, into the partial areas, the swaps are prevented from occurring when each partial area is processed.

Then, since either of the available memory capacity that can be obtained automatically utilizing the system command, or the value inputted by the operator can be used as the upper limit value, a flexible process is possible according to status of use of the memory in the image processing apparatus and the memory capacity mounted on the image processing apparatus. Furthermore, it is possible to execute finer setting control of the upper limit value using the priority information relating to the priority of memory consumption or the processing speed. Yet furthermore, it is possible to know the memory capacity necessary for executing the hidden-line removal without dividing the two-dimensional plane and a measure for adding memories can be obtained.

As set forth hereinabove, according to the invention, a hidden-line removal can be realized in which memory consumption necessary for the hidden-line removal is optimized and occurrence of swaps is prevented.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A hidden-line removal method executed in an image processing apparatus, in which projection of lines obscured by polygons included in a three-dimensional model is avoided when projecting the three-dimensional model onto a two-dimensional plane, the image processing apparatus having a memory for storing data relating to the hidden-line removal and data relating to processes other than the hidden-line removal, wherein an upper limit value of capacity of the memory used for the hidden-line removal is set in advance, the method comprising:

when the two-dimensional plane is divided into a plurality of areas, extracting portions of the polygons contained in each of the areas using the projected three-dimensional model;

calculating memory consumption for each of the areas based on the extracted polygons;

when the maximum of the calculated memory consumption for each of the areas is equal to or larger than the upper limit value, subdividing the two-dimensional plane to extract the polygons using the projected three-dimensional model contained in the subdivided areas and repeating the calculation of memory consumption based on the extracted polygons; and when the maximum of the calculated memory consumption for each of the areas is smaller than the upper limit value, executing hidden-line removal for the extracted polygons in each of the areas and, after generating hidden-line removal data for each of the areas, integrating the hidden-line removal data for the plurality of areas.

2. The hidden-line removal method according to claim 1, wherein the dividing into the plurality of areas is binary tree dividing.

3. The hidden-line removal method according to claim 1, wherein the upper limit value is set based on an available capacity of the memory before the extraction of the polygons.

4. The hidden-line removal method according to claim 1, wherein priority relating to memory consumption and to processing time is further set in advance, wherein when the priority of processing time is higher than the priority of memory consumption, the upper limit value is set based on an available capacity of the memory before the extraction of the polygons, and wherein when the priority of processing time is lower than the priority of memory consumption, the upper limit value is set at a value of a capacity smaller than the available capacity of the memory before the extraction of the polygons.

5. The hidden-line removal method according to claim 1, wherein the image processing apparatus:

is further connected with an output apparatus for outputting and displaying the integrated hidden-line removal data; and calculates a memory consumption for the case where the dividing is not executed and outputs and displays the memory consumption for the case where the dividing is not executed through the output apparatus.

6. A computer-readable storage medium encoded with a program for executing, in an image processing apparatus, hidden-line removal in which projection of lines obscured by polygons included in a three-dimensional model is avoided when projecting the three-dimensional model onto a two-dimensional plane, the image processing apparatus having a memory for storing data relating to the hidden-line removal and data relating to processes other than the hidden-line removal, wherein an upper limit value of capacity of the memory used for the hidden-line removal is set in advance, the program causing the image processing apparatus to execute:

when the two-dimensional plane is divided into a plurality of areas, extracting portions of the polygons contained in each of the areas using the projected three-dimensional model;

calculating memory consumption for each of the areas based on the extracted polygons;

when the maximum of the calculated memory consumption for each of the areas is equal to or larger than the upper limit value, subdividing the two-dimensional plane to extract the polygons using the projected three-dimensional model contained in the subdivided areas and repeating the calculation of memory consumption based on the extracted polygons; and when the maximum of the calculated memory consumption for each of the areas is smaller than the upper limit value, executing hidden-line removal for the extracted polygons in each of the areas and, after generating hidden-line removal data for each of the areas, integrating the hidden-line removal data for the plurality of areas.

7. The program according to claim 6, wherein the dividing into the plurality of areas is binary tree dividing.

8. The program according to claim 6, wherein the upper limit value is set based on an available capacity of the memory before the extraction of the polygons.

9. The program according to claim 6, wherein priority relating to memory consumption and to processing time is further set in advance, wherein when the priority of processing time is higher than the priority of memory consumption, the upper limit value is set based on an available capacity of the memory before the extraction of the polygons, and wherein when the priority of processing time is lower than the priority of memory consumption, the upper limit value is set at a value of a capacity smaller than the available capacity of the memory before the extraction of the polygons.

10. The program according to claim 6, wherein the image processing apparatus is further connected with an output apparatus for outputting and displaying the integrated hidden-line removal data; and the program further causes the image processing apparatus to calculate memory consumption for a case where the dividing is not executed, and output and display the memory consumption for the case where the dividing is not executed through the output apparatus.

11. An image processing apparatus for executing hidden-line removal in which projection of lines obscured by polygons included in a three-dimensional model is avoided when projecting the three-dimensional model onto a two-dimensional plane, the image processing apparatus comprising:

a memory which stores data accompanying image processing, and has an upper limit value of a capacity usable for the hidden-line removal therein;

a dividing style determining unit which, when the two-dimensional plane is divided into a plurality of areas, extracts portions of the polygons contained in each of the areas using the projected three-dimensional model, calculates memory consumption for each of the areas based on the extracted polygons, subdivides the two-dimensional plane to extract the polygons using the projected three-dimensional model contained in the subdivided areas until the maximum of the calculated memory consumption for each of the areas becomes smaller than the upper limit value, repeats the calculation of memory consumption based on the extracted polygons, and determines the dividing style of the two-dimensional plane;

a hidden-line removal unit which executes hidden-line removal on the extracted polygons in each of the areas after division depending on the dividing style determined by the dividing style determining unit and creates hidden-line removal data for each of the areas; and a integrating unit which integrates the hidden-line removal data for the plurality of areas.

12. The image processing apparatus according to claim 11, wherein the dividing style determining unit executes binary tree dividing to divide the two-dimensional plane.

13. The image processing apparatus according to claim 11, wherein the upper limit value is set at an available capacity of the memory before the hidden-line removal is started.

14. The image processing apparatus according to claim 11, wherein priority relating to memory consumption and to processing time are further set in the memory, wherein when the priority of processing time is higher than the priority of memory consumption, the upper limit value is set based on an available capacity of the memory before the extraction of the polygons, and wherein when the priority of processing time is lower than the priority of memory consumption, the upper limit value is set at a value of a capacity smaller than the available capacity of the memory before the extraction of the polygons.

15. The image processing apparatus according to claim 11, further comprising an image display unit for outputting the integrated hidden-line removal data for external displaying, wherein the dividing style determining unit further calculates memory consumption for the case where the dividing is not executed, and outputs the memory consumption for the case where the dividing is not executed through the image display unit for external displaying.

* * * * *